United States Patent
Anand et al.

(10) Patent No.: US 9,019,939 B2
(45) Date of Patent: Apr. 28, 2015

(54) APPARATUS AND METHOD FOR WCMDA FREQUENCY SCAN OPTIMIZATION

(71) Applicant: Qualcomm Incorporated, San Diego, CA (US)

(72) Inventors: Raghavendra Shyam Anand, Hyderabad (IN); Anand Rajurkar, Hyderabad (IN); Niranjan Vadlamudi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 13/894,237

(22) Filed: May 14, 2013

(65) Prior Publication Data

US 2014/0064254 A1    Mar. 6, 2014

Related U.S. Application Data

(60) Provisional application No. 61/694,146, filed on Aug. 28, 2012.

(51) Int. Cl.
*H04L 7/04* (2006.01)
*H04B 1/707* (2011.01)

(52) U.S. Cl.
CPC ............... *H04L 7/042* (2013.01); *H04B 1/707* (2013.01)

(58) Field of Classification Search
USPC .......................... 370/335, 344, 347, 342, 201
See application file for complete search history.

(56) References Cited

U.S. PATENT DOCUMENTS

| | | | |
|---|---|---|---|
| 7,039,036 B1 | 5/2006 | Dabak et al. | |
| 8,160,528 B2 | 4/2012 | Thampi et al. | |
| 8,391,345 B2 | 3/2013 | Filipovic et al. | |
| 2006/0109931 A1* | 5/2006 | Asai et al. | 375/299 |
| 2010/0091674 A1 | 4/2010 | Sjoegren et al. | |
| 2011/0085589 A1* | 4/2011 | Filipovic et al. | 375/224 |
| 2011/0090864 A1 | 4/2011 | Nylander et al. | |
| 2012/0252446 A1 | 10/2012 | Reial et al. | |

FOREIGN PATENT DOCUMENTS

EP    1655872 A1    5/2006

OTHER PUBLICATIONS

International Search Report and Written Opinion—PCT/US2013/057146—ISA/EPO—Jan. 2, 2013.
Oner et al., "Air interface identification for Software Radio systems", AEU International Journal of Electronics and Communications, Elsevier, Jena, DE, vol. 61, No. 2, Jan. 8, 2007, pp. 104-117, XP005825399, ISSN: 1434-8411, DOI: 10.1016/J.AEUE.2006.03.005 Section 1, section 4, conclusion.
ETSI TS 125.143: "3rd Generation Partnership Project; Universal Mobile Telecommunications System (UTMS), UTRA Repeater Conformance testing," 3GPP TS 25.143 version 10.2.0, Release 10, Jul. 2012, pp. 1-72.

* cited by examiner

*Primary Examiner* — Dady Chery
(74) *Attorney, Agent, or Firm* — Darren M. Simon

(57) ABSTRACT

Methods and apparatus for wireless communication, in a mobile device, that includes receiving a signal from a network and obtaining pruned autocorrelation for specific channel delays of the received signal. Aspects of the methods and apparatus include determining pruned autocorrelation properties of the received signal. Aspects of the methods and apparatus also include comparing the pruned autocorrelation properties of the received signal against a reference threshold. Aspects of the methods and apparatus also include verifying that the received signal is a valid signal for WCMDA processing.

22 Claims, 14 Drawing Sheets

Autocorrelation of GSM signal received over 5 MHz band

Autocorrelation of LTE signal received over 5 MHz band

Autocorrelation of WCDMA signal received over 5 MHz band

APPARATUS AND METHOD FOR WCMDA FREQUENCY SCAN OPTIMIZATION

CLAIM OF PRIORITY UNDER 35 U.S.C §119

The present application for patent claims priority to U.S. Provisional Application No. 61/694,146 entitled "APPARATUS AND METHOD FOR WCMDA FREQUENCY SCAN OPTIMIZATION" filed Aug. 28, 2012, and assigned to the assignee hereof and hereby expressly incorporated by reference.

BACKGROUND

1. Field

Aspects of the present disclosure relate generally to wireless communication systems, and more particularly, to an apparatus and method of detecting a valid UTRA Absolute Radio Frequency Channel Number (UARFCN) among multiple invalid UARFCNs in a wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Mobile Telephone System (UMTS) Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. Since multiple interface standards are transmitted over the same RF band, ferreting out valid WCMDA UARFCN (UARFCN is UTRA Absolute Radio Frequency Channel Number, where UTRA is UMTS Terrestrial Radio Network and where UMTS is Universal Mobile Telephone System) among invalid UARFCN, such as Long Term Evolution (LTE) and Global System for Mobile (GSM), is instrumental in reducing latency periods for mobile wireless communication.

Thus, one such desired enhancement of the user experience relates to identifying valid WCMDA UARFCN among non-valid UARFCN when a user equipment (UE) is communicating with the UMTS network, thereby improving the efficiency of wireless communication system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method for identifying valid WCMDA UARFCN among non-valid UARFCN is provided. The method includes receiving a signal from a network and obtaining pruned autocorrelation for specific channel delays of the received signal. Additionally, the method includes determining pruned autocorrelation properties of the received signal. Further, the method includes comparing the pruned autocorrelation properties of the received signal against a reference threshold. Still further, the method includes verifying that the received signal is a valid signal for WCMDA processing.

In another aspect, an apparatus for identifying valid WCMDA UARFCN among non-valid UARFCN is provided. The apparatus includes a processor configured to receive a signal from a network and obtain pruned autocorrelation for specific channel delays of the received signal. Additionally, the processor is configured to determine pruned autocorrelation properties of the received signal. Further, the processor is configured to compare the pruned autocorrelation properties of the received signal against a reference threshold. Still further, the processor is configured to verify that the received signal is a valid signal for WCMDA processing.

In another aspect, an apparatus for identifying valid WCMDA UARFCN among non-valid UARFCN is provided that includes means for receiving a signal from a network and means for obtaining pruned autocorrelation for specific channel delays of the received signal. Additionally, the apparatus includes means for determining pruned autocorrelation properties of the received signal. Further, the apparatus includes means for comparing the pruned autocorrelation properties of the received signal against a reference threshold. Still further, the apparatus includes means for verifying that the received signal is a valid signal for WCMDA processing.

In yet another aspect, a computer-readable media for identifying valid WCMDA UARFCN among non-valid UARFCN is provided that includes machine-executable code for receiving a signal from a network and obtaining pruned autocorrelation for specific channel delays of the received signal. Additionally, the code may be executable for determining pruned autocorrelation properties of the received signal. Further, the code may be executable for comparing the pruned autocorrelation properties of the received signal against a reference threshold. Still further, the code may be executable for verifying that the received signal is a valid signal for WCMDA processing.

These and other aspects of the disclosure will become more fully understood upon a review of the detailed description, which follows.

DETAILED DESCRIPTION

Figure 1:
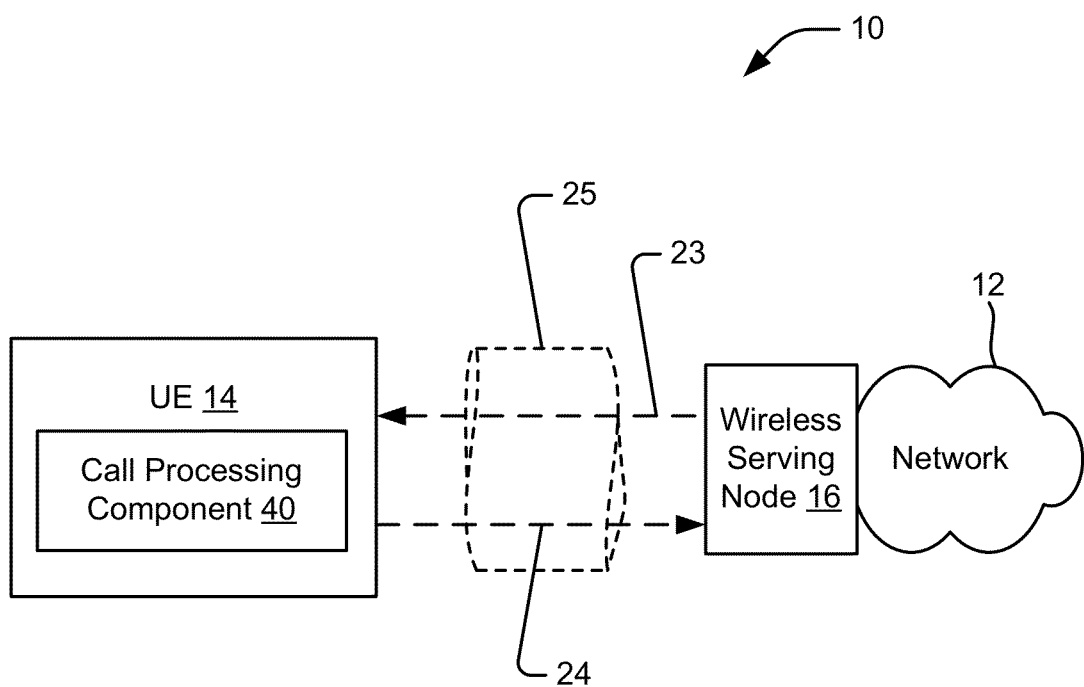
FIG. 1 is a schematic diagram illustrating an example wireless system of aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As a part of cell search, the UE is required to identify the slot boundary and frame boundary of NodeB of a UMTS network. Dedicated Primary-Synchronization Channel (PSCH) is provided for slot boundary identification and Secondary-Synchronization Channel (SSCH) is provided for frame boundary identification. PSCH/SSCH is a burst channel of length 256 chips with repetition rate of 2560 chips. The first 256 chips of each slot contains PSCH and SSCH signatures. In a UMTS system, the UE performs multiple PSCH slot search hypotheses to help identify the slot boundary (PSCH step) for each PSCH slot search hypotheses and performs multiple SSCH frame search to help identify the frame boundary (SSCH step) for each SSCH slot search hypotheses. In other words, in UMTS, a UE searches for all possible slot hypothesis (minimum 2560) during a PSCH search and selects more than one slot hypothesis for frame boundary identification. For example, for each hypothesis selected in a PSCH search, a UE performs multiple SSCH searches for frame boundary identification.

Generally, PSCH identification uses a signature identity correlation, matched to PSCH signature of length 256 chips. However, because of long periodicity of PSCH (2560 chips), at least 2560 correlations are needed to identify presence of PSCH cell. Considering a small raster of 200 KHz, the correlation structure, and since the time taken to identify a cell slot boundary is proportional to ability of the receiver to quickly reject UARFCN, the ability for the UE to recognize a valid WCMDA UARFCN among non-valid UARFCN before PSCH/SSCH processing is paramount.

Indeed, aspects of this apparatus and method take advantage of the fact that a WCDMA downlink signal is multiplied by scrambling codes and that both PSCH and SSCH channels are added to signal. Consequently, the downlink signal exhibits excellent autocorrelation properties since the autocorrelation properties of scrambling codes and SCH signatures can easily be identified, where the autocorrelation property: peak at delay 0 is very high and the autocorrelation for other non zero delay is very low. Indeed, individually PSCH, SSCH and PSC have excellent autocorrelation properties.

Contrastingly, other 3GPP family downlink signals do not exhibit such autocorrelation properties. This can readily be seen in FIG. 5, where a GSM signal shows significant peaks in autocorrelation for some non zero delay.

Thus, aspects of this apparatus and method include providing for identifying valid WCMDA UARFCN among non-valid UARFCN when a user equipment (UE) is communicating with the searching for UMTS signal in a UMTS network.

Referring to FIG. 1, in one aspect, a wireless communication system 10 is configured to facilitate transmitting vast amount of data from a mobile device to a network at a fast data transfer rate. Wireless communication system 10 includes at least one UE 14 that may communicate wirelessly with one or more network 12 via serving nodes, including, but not limited to, wireless serving node 16 over one or more wireless link 25. The one or more wireless link 25, may include, but are not limited to, signaling radio bearers and/or data radio bearers. Wireless serving node 16 may be configured to transmit one or more signals 23 to UE 14 over the one or more wireless link 25, and/or UE 14 may transmit one or more signals 24 to wireless serving node 16. In an aspect, signal 23 and signal 24 may include, but are not limited to, one or more messages, such as transmitting a data from the UE 14 to the network via wireless serving node 16.

In an aspect, UE 14 may include a call processing component 40, which may be configured to transmit a data to the wireless serving node 16 over wireless link 25. Specifically, in an aspect, call processing component 40 of UE 14, is configured to receive a signal from a network, remove a channel delay spread, determine the autocorrelation properties of the signal, compare the autocorrelation properties with a reference threshold, and verify that the received signal is a valid signal.

UE 14 may comprise a mobile apparatus and may be referred to as such throughout the present disclosure. Such a mobile apparatus or UE 14 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 16 of wireless communication system 10, may include one or more of any type of network component, such as an access point, including a BS or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 10 may include one or more small base stations, such as, but not limited to a femtocell, picocell, microcell, or any other small base station.

Figure 2:
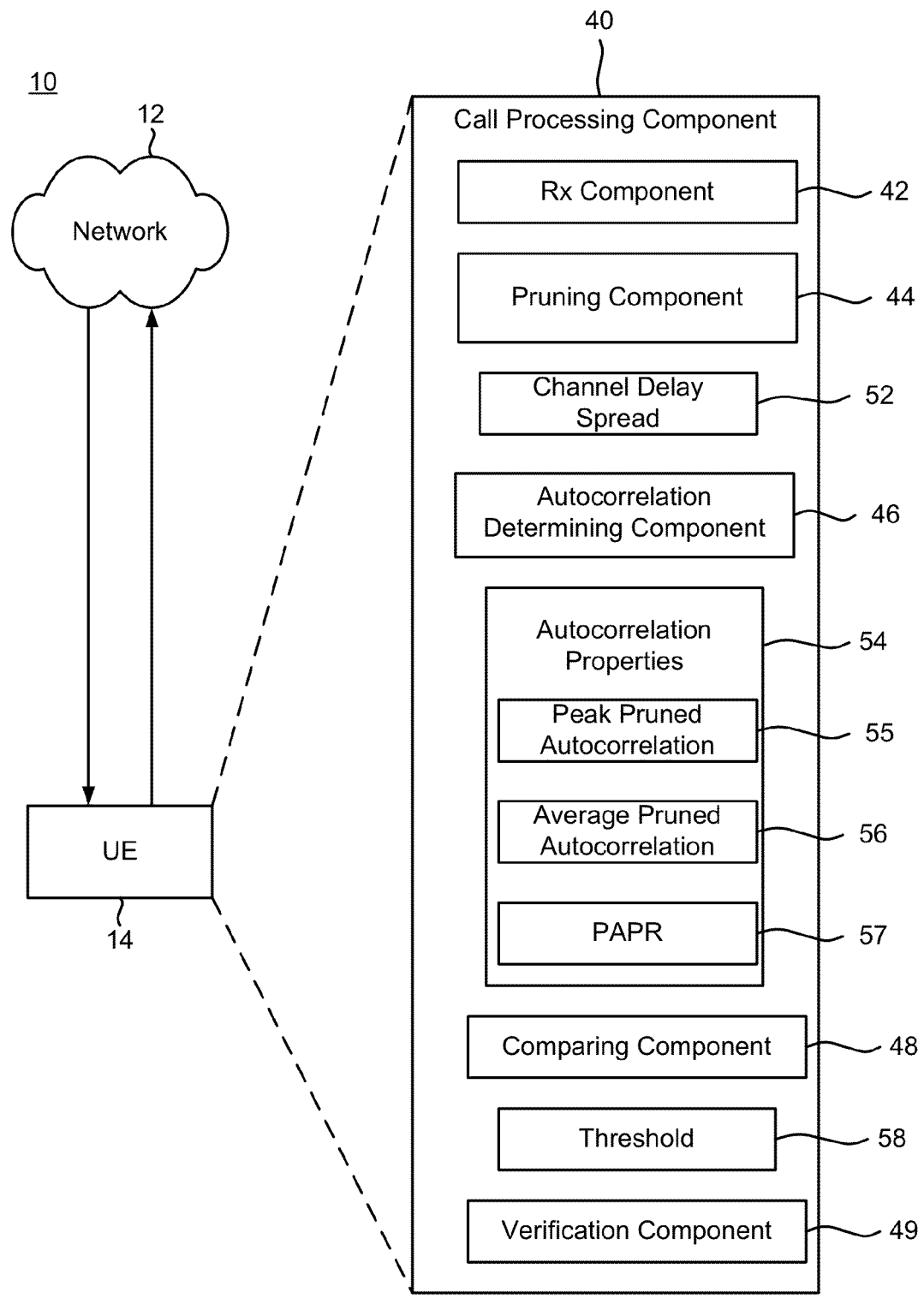
FIG. 2 is a schematic diagram illustrating exemplary aspect of call processing in a wireless communication system.

FIG. 2 discloses a wireless communication system 10 configured to include wireless communications between network 12 and UE 14. The wireless communications system may be configured to support communications between a number of users. FIG. 2 illustrates a manner in which network 12 communicates with UE 14. The wireless communication system 10 can be configured for downlink message transmission or uplink message transmission, as represented by the up/down arrows between network 12 and UE 14.

In an aspect, within the UE 14 resides a call processing component 40. The call processing component 40 may be configured, among other things, to include a RX component 42 for receiving a signal 23 from network 12. In other words, the RX component 42 is configured to receive a signal 23 at the UE 14 from network 12 via wireless serving node 16 over wireless link 25.

In another aspect, the call processing component may also be configured to include a pruning component 44 for obtaining pruned autocorrelation for specific channel delays of received signal 23, where the pruning length of received signal 23 is based on a radio channel of received signal 23. Indeed, pruning component 44 is configured for removing the effects of a channel delay spread 52 from a wireless channel of an autocorrelation of received signal 23; thereby minimizing the effect of channel delay spread 52 on the autocorrelation properties of the received signal 23. In other words, pruning component 44 obtains pruned autocorrelation of received signal 23 when the UE 14 receives the signal 23 from network 12 via wireless serving node 16 over wireless link 25.

Additionally, the call processing component 40 may be configured to include an autocorrelation determining component 46 for evaluating the pruned autocorrelation properties 54 for the received signal after processing by the pruning component 44. In other words, the autocorrelation determining component 46 determines pruned autocorrelation properties 54 of the received signal 23, such as a peak pruned autocorrelation 55, the average pruned autocorrelation 56, and a Peak to Average Power Ratio (PAPR) 57 of the pruned autocorrelation of the received signal 23.

In yet another aspect, the call processing component may also be configured to include a comparing component 48 configured for comparing, for example, the PAPR 57 of the pruned autocorrelation of the received signal 23 against a reference threshold 58. The reference threshold may be variable based on UE input and also may be fixed after the comparison to the pruned autocorrelation properties has been completed. In other words, the comparing component 48 compares pruned autocorrelation properties 54 of the received signal 23 with the reference threshold 58 for identification of a proper WCDMA signal.

Last, the call processing component 40 may be configured to include a verifying component 49 to verify that the received signal is a valid signal for WCMDA processing based on the comparison of the pruned autocorrelation properties 54 of the received signal 23 with the reference threshold 58. In other words, the verifying component 49 verifies that the received signal 23, after processing by the pruning component 44, is a valid signal for WCMDA processing based on the results of comparing the pruned autocorrelation properties 54 of the received signal 23 with the reference threshold 58.

In a specific use case and as discussed above, a downlink signal exhibits excellent pruned autocorrelation properties. Contrastingly, other 3GPP family downlink signals do not exhibit such distinctive autocorrelation properties. For example, since a typical channel spread is around 30 to 40 chips for WCDMA signals, a WCDMA signal does not show significant peaks beyond channel spread, even after passing through a channel. On the other hand, OFDM and GSM signals possess significant autocorrelation peaks beyond 50 chips (OFDM around 60 chips or more, GSM around 400 chips or more).

Consequently, the specific delays of received signal 23 may be determined by coexisting technologies, wherein the delay positions selected (post pruning) for obtaining PAPR is determined by other co existing technologies. For example, if GSM is expected then pruned autocorrelation should include delays where GSM signal shows significant peaks.

Therefore, aspects of the described apparatus and method differentiate between WCDMA type signals verses other types of signals, such as OFDM and GSM signals, where a UE determines the pruned autocorrelation properties of a received signal, compares the pruned autocorrelation properties to a reference threshold, and verifies that the received signal is WCMDA signal verses an invalid signal.

Specifically, the autocorrelation determining component 46 determines the peak to average ratio of the received signal 23. This peak to average ratio is then compared by the comparing component 48 to a reference threshold 58 to verify if the received signal 23 is WCMDA signal verses an invalid signal, such as a LTE or GSM signal.

It should be noted that the algorithm that provides for proper autocorrelation determination of autocorrelation properties 54 is as follows:

$M$ = length of non *coherent* averaging $N$ = length of *coherent* averaging $x$ = received wide band signal $L$ = channel delay spread, in number of samples $$R_{xx}(k) = \sum_{m=0}^{M-1} \sum_{n=0}^{N-1} x(mN + n) * conj(x(mN + n + k))$$

$\phi_{xx}(k) = 0$ if $k < L$, $R_{xx}(k)$ otherwise $$\sigma = \frac{1}{K-L} \sum_{k=0}^{K-1} \phi xx(k)$$

$$\alpha = \text{maximum}(\phi_{xx}(k))$$

$$\Gamma = \frac{\alpha}{\sigma}$$

$R_{xx}$ (k) represents the autocorrelation of the received signal before the received signal is processed by the pruning component 44 to remove correlation due to channel delay spread (L). The term (k) may refer to a delay measured in chips. Accordingly, $R_{xx}(k)$ represents correlation values of the received signal x with a delayed signal over a period defined by the length of coherent averaging, N, and the length of non-coherent averaging M. Further, $\Phi_{xx}(k)$ represents a pruned autocorrelation where correlation due to channel delay spread (L) is removed. Also note, sigma (σ) represents the average autocorrelation of the received signal, alpha (α) represents the peak of pruned autocorrelation of the received signal, and Γ represent the peak to average ratio of the pruned autocorrelation of the received signal.

Thus, the present apparatus and methods provides for a UE-based call processing component 40 that identifies valid WCMDA UARFCN among non-valid UARFCN.

Figure 3:
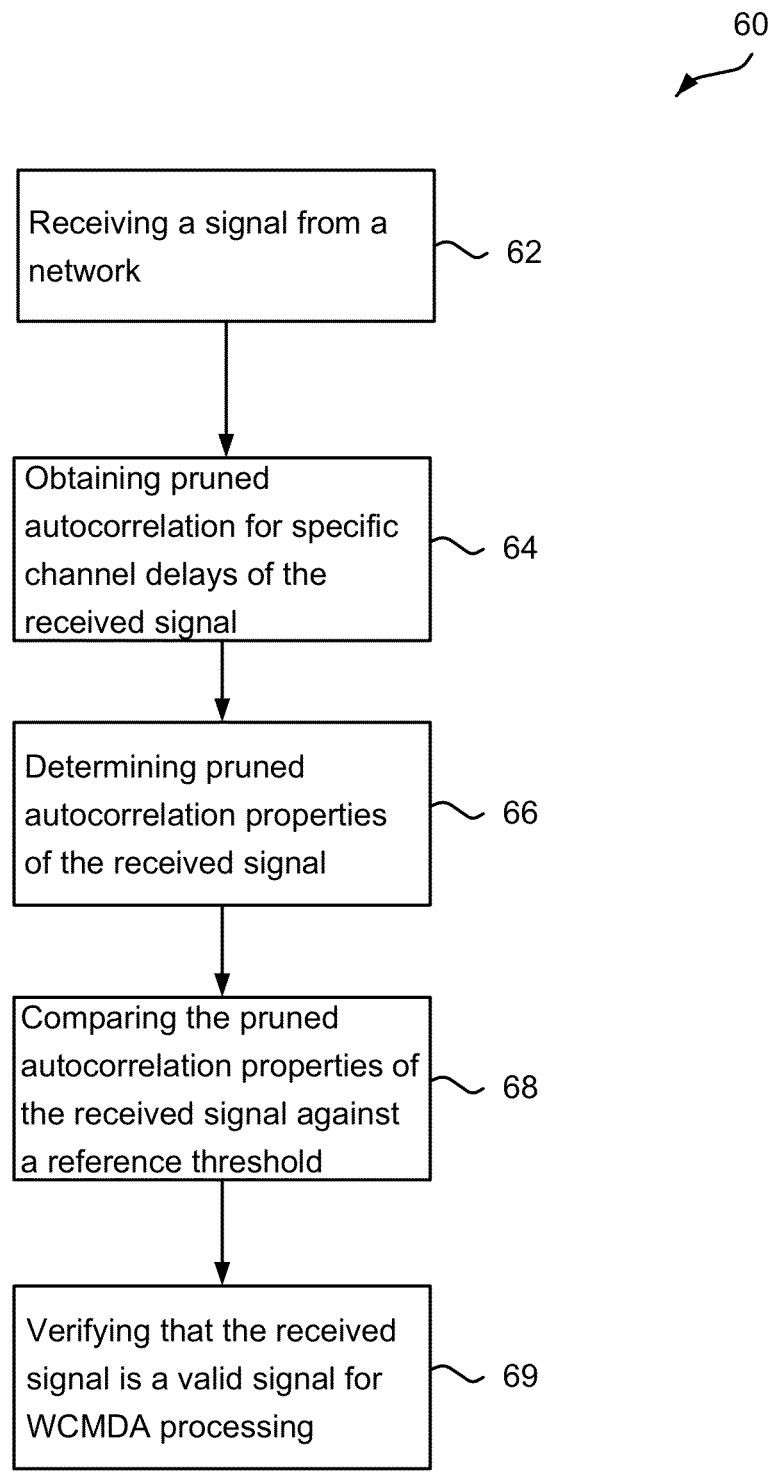
FIG. 3 is a flow diagram illustrating an exemplary method of autocorrelation processing of in a wireless communication system.

FIG. 3 a flow diagram illustrating an exemplary method 60. In an aspect, method 60 may be performed by a UE (e.g., UE 14 of FIG. 2), and may be performed by a processor or other component capable of executing computer-executable instructions for performing the steps of FIG. 4. In some examples, method 60 may include a UE with a call processing component 40 that may be configured to receive a signal from a network, remove a channel delay spread, determine the autocorrelation properties of the signal, compare the autocorrelation properties with a reference threshold, and verify that the received signal is a valid signal.

At 62, the UE is configured for receiving a signal from a network. For example, the RX component 42 is configured to receive a signal 23 at the UE 14 from network 12 via wireless serving node 16 over wireless link 25.

At 64, the UE is configured for obtaining pruned autocorrelation for specific channel delays of the received signal by removing the effects of channel delay spread from a wireless channel of an autocorrelation of the received signal. For example, pruning component 44 obtains pruned autocorrelation of received signal 23 when the UE 14 receives the signal 23 from network 12 via wireless serving node 16 over wireless link 25.

At 66, the UE is configured for determining pruned autocorrelation properties of the received signal. For example, the autocorrelation determining component 46 determines pruned autocorrelation properties 54 of the received signal 23 of the received signal 23.

At 68, the UE is configured for comparing the pruned autocorrelation properties of the received signal with a reference threshold. For example, the comparing component 48 compares pruned autocorrelation properties 54 of the received signal 23 with the reference threshold 58 for identification of a proper WCDMA signal.

At 69, the UE is configured for verifying that the received signal is a valid signal for WCMDA processing based on the comparison of the pruned autocorrelation properties of the signal with the reference threshold. For example, the verifying component 49 verifies that the received signal 23, after processing by the pruning component 44, is a valid signal for WCMDA processing based on the results of comparing the pruned autocorrelation properties 54 of the received signal 23 with the reference threshold 58.

In an aspect, for example, the executing method 60 may be UE 14 or network 12 (FIG. 2) executing the call processing component 40 (FIG. 2), or respective components thereof.

Figure 4:
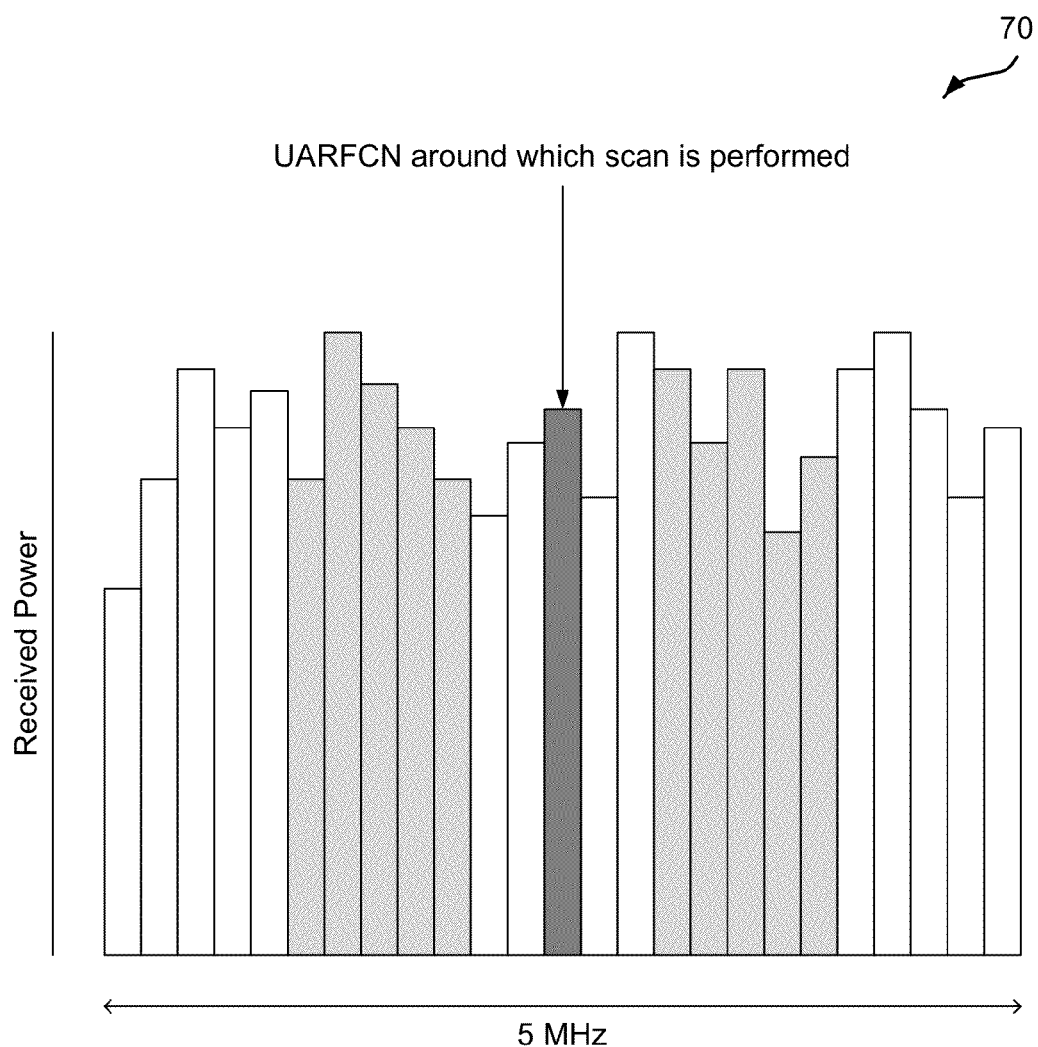
FIG. 4 is schematic diagram illustrating an exemplary candidate UARFCN for WCDMA processing according to aspects of the present disclosure.

FIG. 4 is schematic diagram illustrating an exemplary candidate UARFCN for WCDMA processing according to aspects of the present disclosure. This figure represents the received signal power over 200 KHz bandwidth centered around each UARFCN. Overall picture shows 5 MHz, that covers twenty five UARFCNs. In a UMTS frequency scan, the power is measured over 5 MHz centered on each UARFCN to detect the presence of signal. Because of coexistence of other technology like LTE, this step does not guarantee the presence of UMTS signal. After this step, contemporary UE searches for PSCH and SSCH signature over 5 MHz centered around dark grey UARFCN. Note, the Y axis shows the received power over 200 kHz, centered on each UARFCN.

In an aspect, WCDMA spectrum is marked by UARFCN spaced at a raster of 200 kHz, as seen in FIG. 4. An operator can deploy WCDMA over a bandwidth of 4.6 to 5.1 MHz, centered over one of the UARFCNs. The UE is then required to scan each downlink UARFCN for PSCH+SSCH signal if the Received Signal Strength Indication (RSSI) on the particular UARFCN (5 MHz centered at that UARFCN) is above a reference threshold (that means some signal is present in the band of interest). Whenever LTE/GSM signal is present in this 5 MHz of interest, RSSI threshold check will pass and UE attempts to identify PSCH+SSCH. If PSCH/SSCH identification fails, UE will switch to next UARFCN, which is 200 kHz away from present UARFCN. As such, this it will cover all the UARFCNs in a received signal.

However, if PAPR of pruned autocorrelation is greater than reference threshold, then the implication is that some non WCDMA signals are present in the 5 MHz scan area. Note, WCDMA signal cannot be present on these groups of UARFCNs because WCMDA signal occupies 5 MHz around an UARFCN (so other technology signal should not be there if WCDMA signal is present). When UE detects this condition it can reject band of UARFCNs in this 5 MHz (4.6 MHz).

Figure 5:
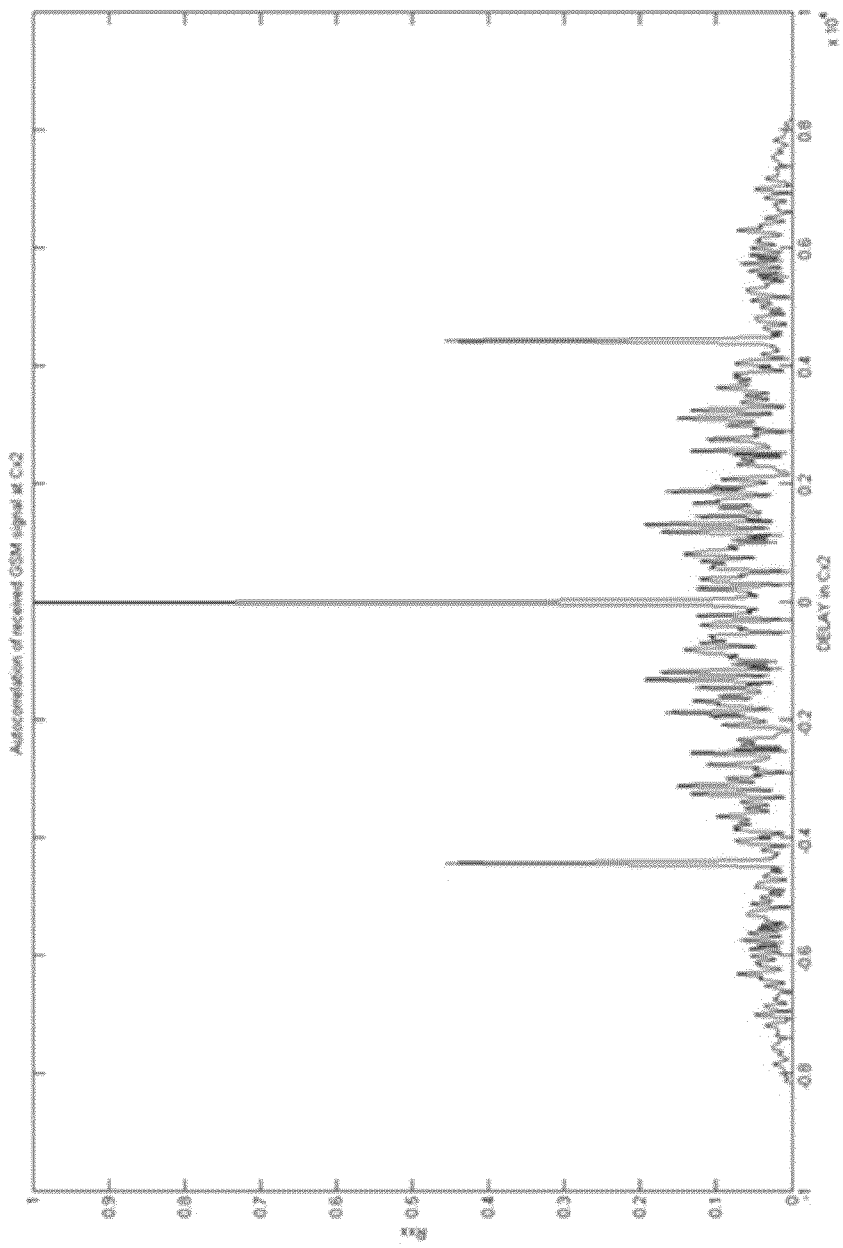
FIGS. 5-7 are graphical representations of normal autocorrelation processing on different types of wireless communication systems.
Figure 6:
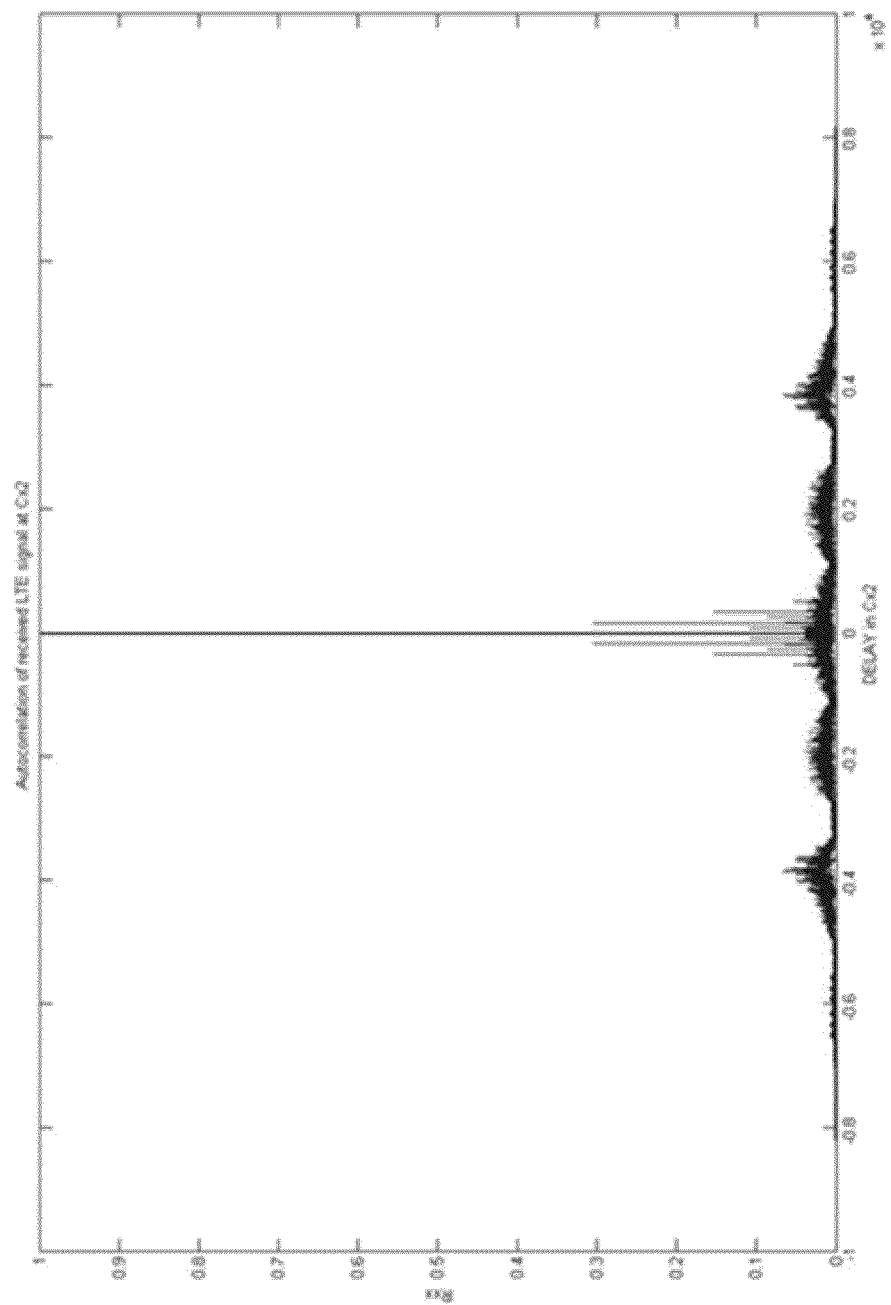
Figure 7:
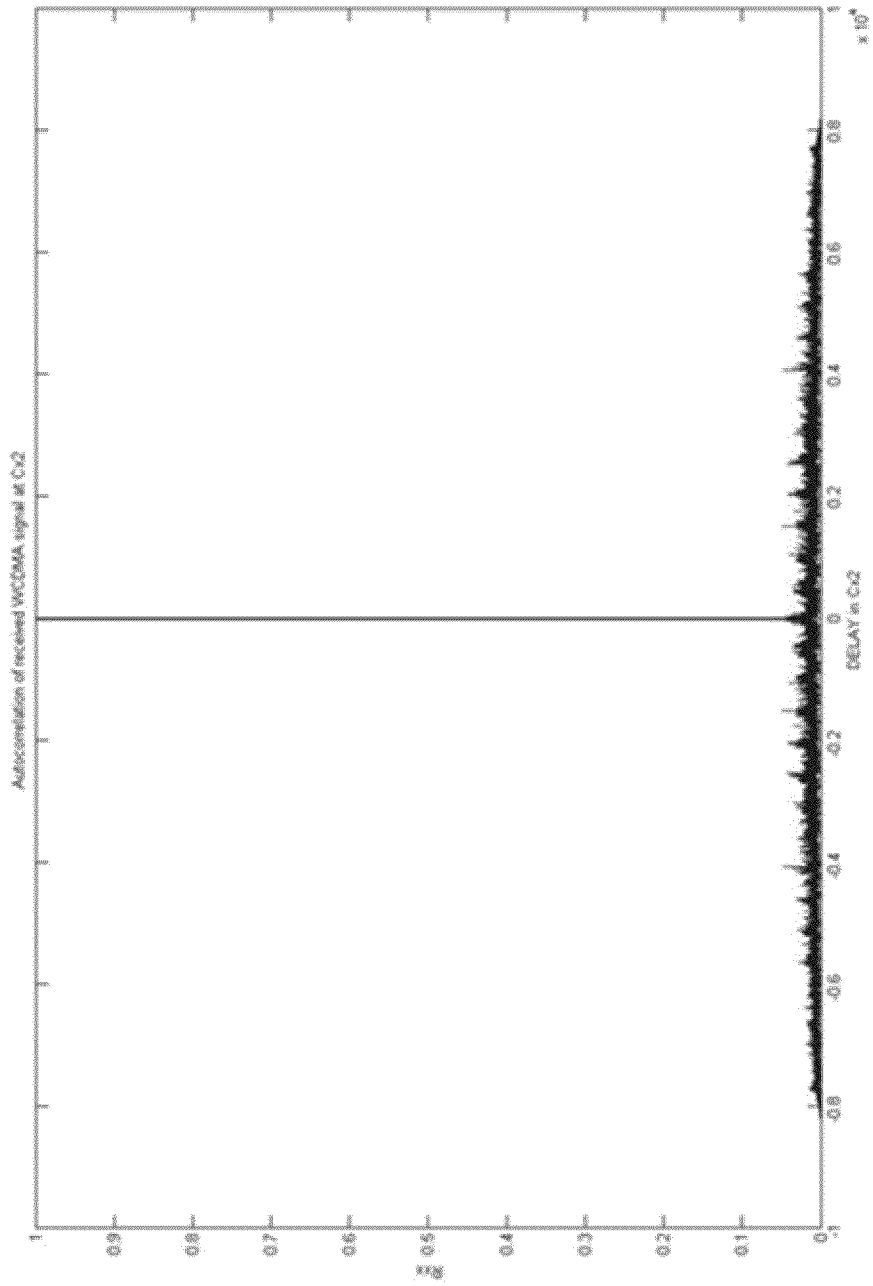

FIGS. 5-7 are graphical representations of autocorrelation processing on different types of wireless communication systems. These figures show the autocorrelation of the signals transmitted from a base station for GSM, LTE, and WCDMA. Evident from these figures is the presence of significant peaks in autocorrelation at non zero delay for non WCDMA signals. Indeed, after pruned autocorrelation processing of a received signal, by aspects of the present disclosure, would result in identifiable graphical illustration of a valid WCMDA UARFCN among non-valid UARFCN.

Figure 8:
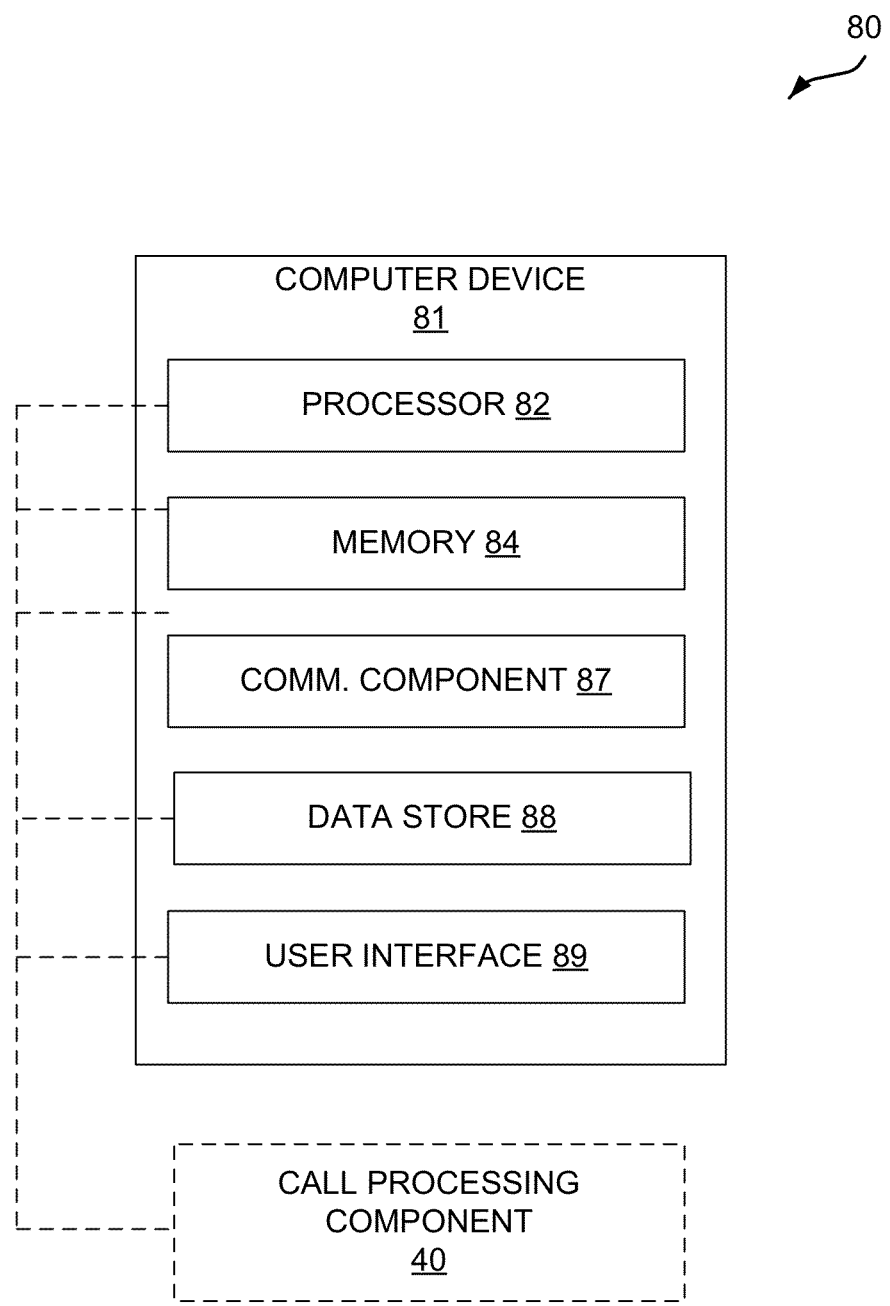
FIG. 8 is a block diagram illustrating additional example components of an aspect of a computer device having a call processing component according to the present disclosure.

Referring to FIG. 8, in one aspect, UE 14 and/or wireless serving node 16 of FIGS. 1 and/or 2 may be represented by a specially programmed or configured computer device 81 of system 80, wherein the special programming or configuration includes call processing component 40, as described herein. For example, for implementation as UE 14 (FIG. 2), computer device 81 may include one or more components for receiving signal 23 at a UE 14 from network 12 via wireless serving node 16, such as in specially programmed computer readable instructions or code, firmware, hardware, or some combination thereof. Computer device 81 includes a processor 82 for carrying out processing functions associated with one or more of components and functions described herein. Processor 82 can include a single or multiple set of processors or multi-core processors. Moreover, processor 82 can be implemented as an integrated processing system and/or a distributed processing system.

Computer device 81 further includes a memory 84, such as for storing data used herein and/or local versions of applications being executed by processor 82. Memory 84 can include any type of memory usable by a computer, such as random access memory (RAM), read only memory (ROM), tapes, magnetic discs, optical discs, volatile memory, non-volatile memory, and any combination thereof.

Further, computer device 81 includes a communications component 86 that provides for establishing and maintaining communications with one or more parties utilizing hardware, software, and services as described herein. Communications component 86 may carry communications between components on computer device 81, as well as between computer device 81 and external devices, such as devices located across a communications network and/or devices serially or locally connected to computer device 81. For example, communications component 86 may include one or more buses, and may further include transmit chain components and receive chain components associated with a transmitter and receiver, respectively, or a transceiver, operable for interfacing with external devices. For example, in an aspect, a receiver of communications component 86 operates to receive one or more data frames via a wireless serving node 16, which may be a part of memory 84. Also, for example, in an aspect, a transmitter of communications component 86 operates to transmit data from UE 14 to a network 12 via a wireless serving node 16 over wireless link 25.

Additionally, computer device 81 may further include a data store 88, which can be any suitable combination of hardware and/or software, that provides for mass storage of information, databases, and programs employed in connection with aspects described herein. For example, data store 88 may be a data repository for applications not currently being executed by processor 82.

Computer device 81 may additionally include a user interface component 89 operable to receive inputs from a user of computer device 81, and further operable to generate outputs for presentation to the user. User interface component 89 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 89 may include one or more output devices, including but not limited to a display, a speaker, a haptic feedback mechanism, a printer, any other mechanism capable of presenting an output to a user, or any combination thereof.

Furthermore, computer device 81 may include, or may be in communication with, call processing component 40, which may be configured to perform the functions described herein.

Figure 9:
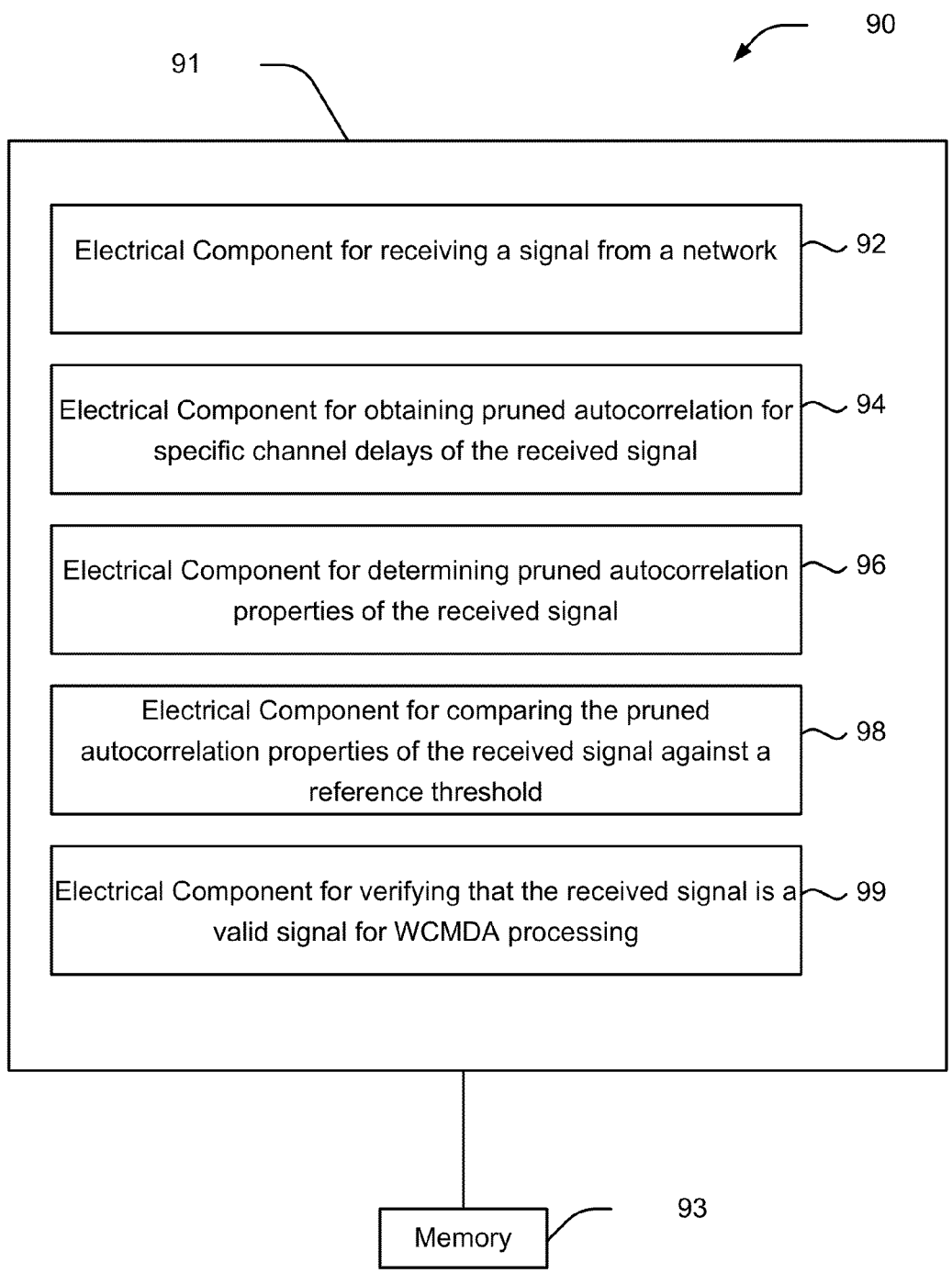
FIG. 9 is a component diagram illustrating aspects of a logical grouping of electrical components as contemplated by the present disclosure.

Referring to FIG. 9, an example system 90 is displayed for transmitting vast amount of data from a mobile device to a network. For example, system 90 can reside at least partially within UE 14 of FIGS. 1 and 2. It is to be appreciated that system 90 is represented as including functional blocks, which can be functional blocks that represent functions implemented by a processor, software, or combination thereof (e.g., firmware). For example, system 90 may be implemented via processor 82, memory 84, communications component 86, and data store 88 of FIG. 4, by for example, processor 82 executing software stored by memory 84 and/or data store 88.

Example system 90 includes a logical grouping 91 of electrical components that can act in conjunction. For instance, logical grouping 91 can include an electrical component 92 for receiving a signal from a network. In an aspect, electrical component 92 may include Rx component 42 (FIG. 2).

Additionally, logical grouping 91 can include an electrical component 94 for obtaining pruned autocorrelation for specific channel delays of the received signal. In an aspect, electrical component 94 may include pruning component 44 (FIG. 2).

In an additional aspect, logical grouping 91 can include an electrical component 96 for determining pruned autocorrelation properties of the received signal. In an aspect, electrical component 96 may include autocorrelation determining component 46 (FIG. 2).

Logical grouping 91 can include an electrical component 98 for comparing the pruned autocorrelation properties of the received signal against a reference threshold. In an aspect, electrical component 98 may include comparing component 48 (FIG. 2).

Logical grouping 91 can include an electrical component 99 for verifying that the received signal is a valid signal for WCMDA processing. In an aspect, electrical component 99 may include verifying component 49 (FIG. 2).

Electrical components 92-99 may correspond to one or more components in FIG. 2, and such components may be separate physical components, components implemented by processor 82 (FIG. 8), or a combination thereof.

Additionally, system 90 can include a memory 93 that retains instructions for executing functions associated with the electrical components 92-99, stores data used or obtained by the electrical components 92, 94, 96, 98, and 99, etc. While shown as being external to memory 93, it is to be understood that one or more of the electrical components 92, 94, 96, 98, and 99 can exist within memory 93. In one example, electrical components 92, 94, 96, 98, and 99 can comprise at least one processor, or each electrical component 92, 94, 96, 98, and 99 can be a corresponding module of at least one processor. Moreover, in an additional or alternative example, electrical components 92, 94, 96, 98, and 99 can be a computer program product including a computer readable medium, where each electrical component 92, 94, 96, 98, and 99 can be corresponding code.

Figure 10:
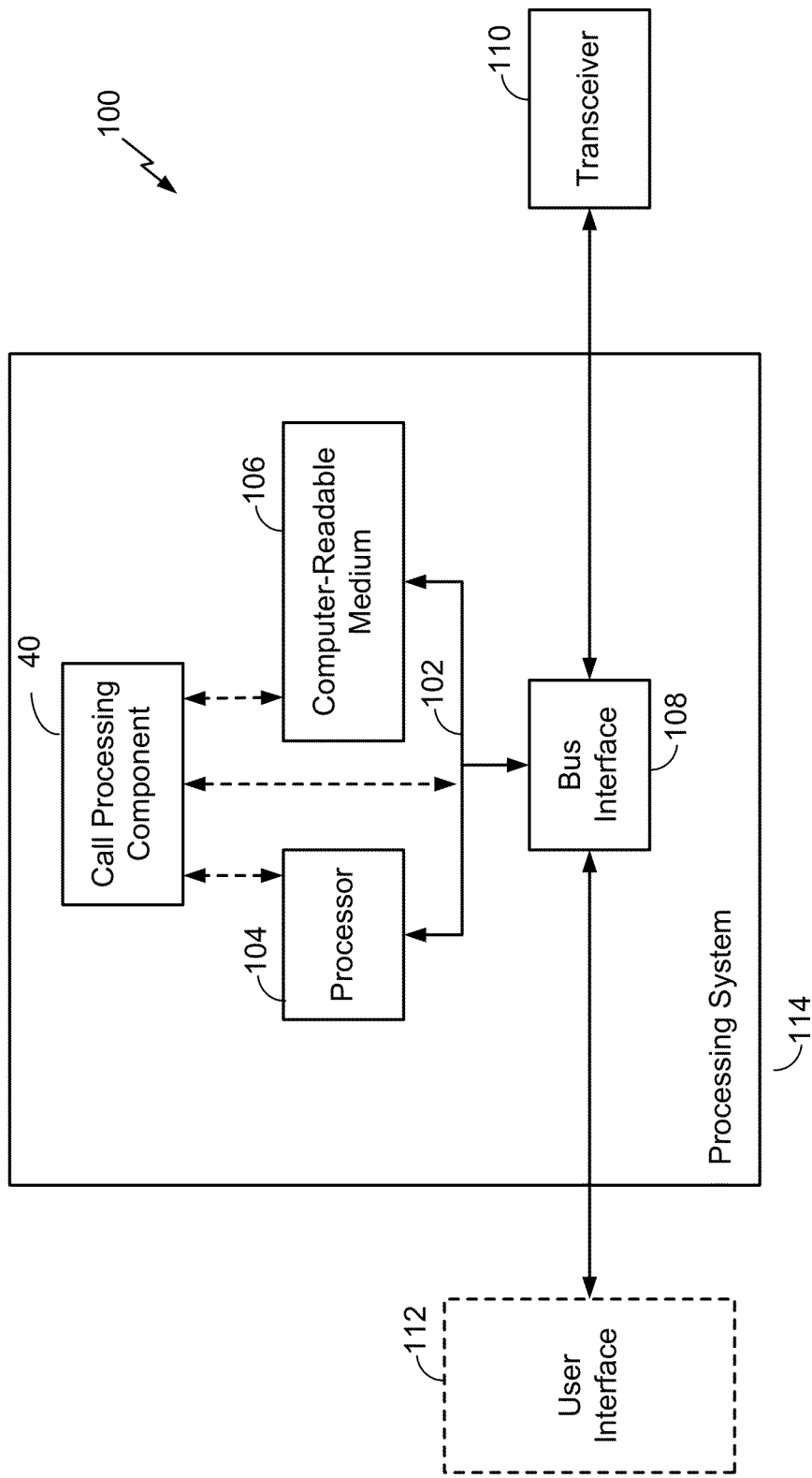
FIG. 10 is a block diagram illustrating an example of a hardware implementation for an apparatus employing a processing system to perform the functions described herein.

FIG. 10 is a block diagram illustrating an example of a hardware implementation for an apparatus 100 employing a processing system 114. Apparatus 100 may be configured to include, for example, wireless communication system 10 (FIG. 1) and/or call processing component 40 (FIG. 1) implementing the components described above, such as, but not limited to Rx component 42, pruning component 44, autocorrelation determining component 46, comparing component 48, and verifying component 49, as described above. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

In an aspect, processor 104, computer-readable medium 106, or a combination of both may be configured or otherwise specially programmed to perform the functionality of the call processing component 40 (FIG. 1) as described herein.

The various concepts presented throughout this disclosure may be implemented across a broad variety of telecommunication systems, network architectures, and communication standards.

Figure 11:
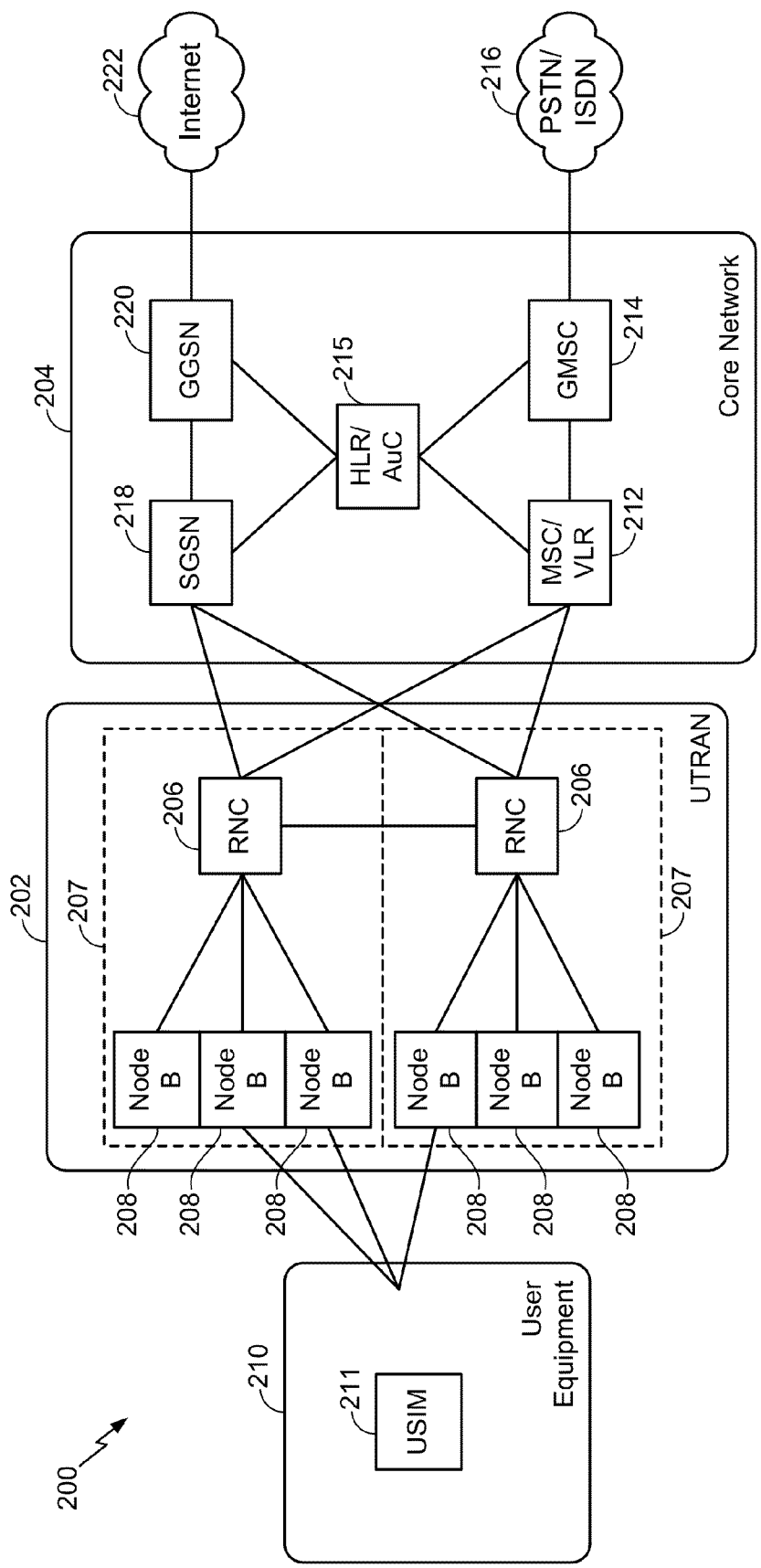
FIG. 11 is a block diagram conceptually illustrating an example of a telecommunications system including a UE configured to perform the functions described herein.

Referring to FIG. 11, by way of example and without limitation, the aspects of the present disclosure are presented with reference to a UMTS system 200 employing a WCDMA air interface. A UMTS network includes three interacting domains: a Core Network (CN) 204, a UMTS Terrestrial Radio Access Network (UTRAN) 202, and User Equipment (UE) 210. UE 210 may be configured to include, for example, the call processing component 40 (FIG. 1) implementing the components described above, such as, but not limited to Rx component 42, pruning component 44, autocorrelation determining component 46, comparing component 48, and verifying component 49, as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 12:
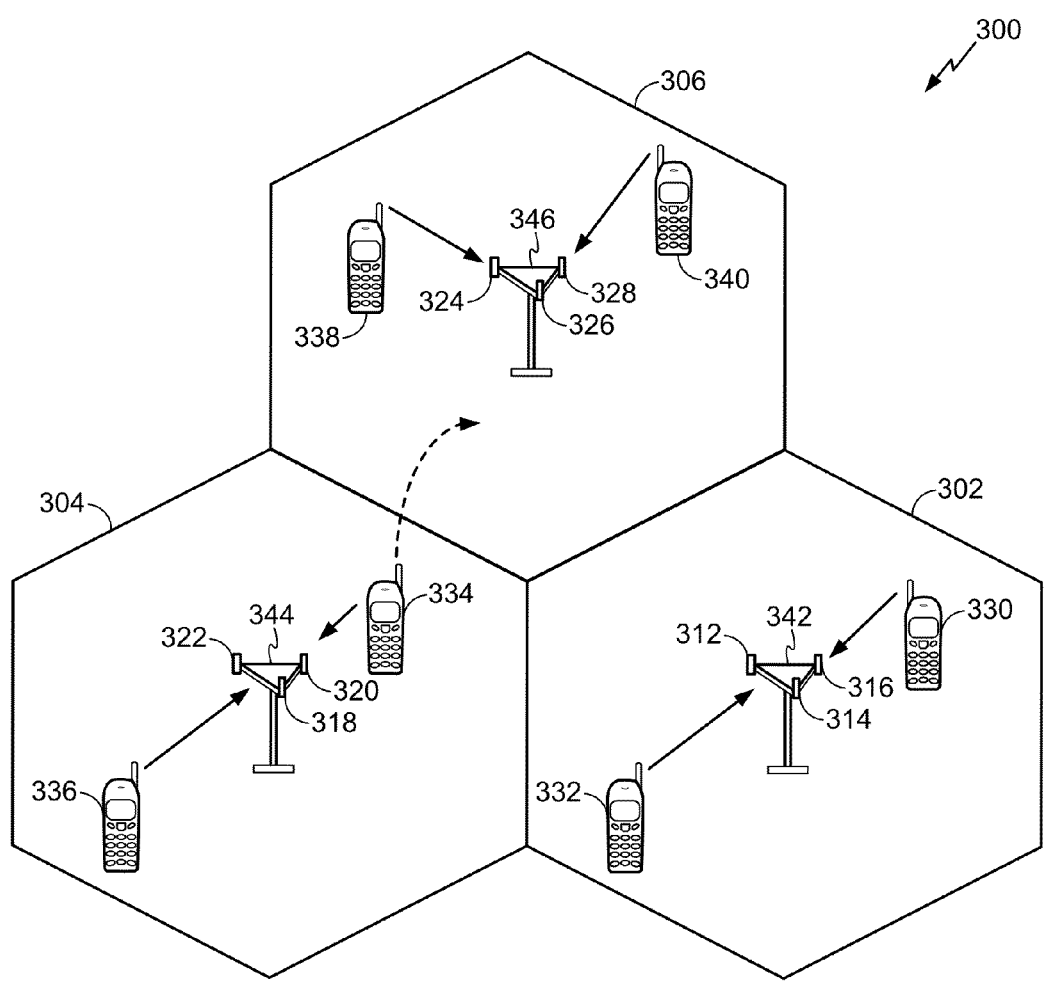
FIG. 12 is a conceptual diagram illustrating an example of an access network for use with a UE configured to perform the functions described herein.

Referring to FIG. 12, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 11) for all the UEs 330, 332, 334, 336, 338, 340 in the respective cells 302, 304, and 306. Node Bs 342, 344, 346 and UEs 330, 332, 334, 336, 338, 340 respectively may be configured to include, for example, the call processing component 40 (FIG. 1) implementing the components described above, such as, but not limited to Rx component 42, pruning component 44, autocorrelation determining component 46, comparing component 48, and verifying component 49, as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 4), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 13.

Figure 13:
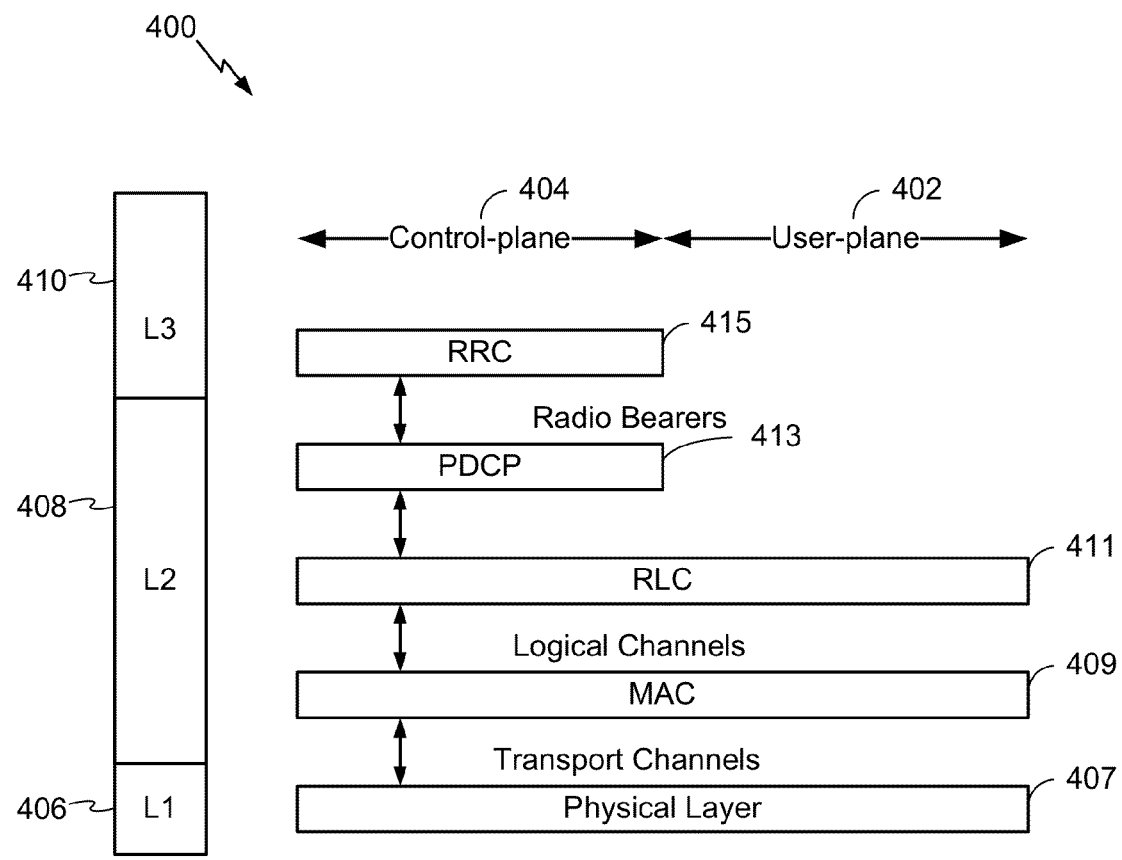
FIG. 13 is a conceptual diagram illustrating an example of a radio protocol architecture for the user and control planes for a base station and/or a UE configured to perform the functions described herein.

FIG. 13 is a conceptual diagram illustrating an example of the radio protocol architecture 400 for the user plane 402 and the control plane 404 of a user equipment (UE) or node B/base station. For example, architecture 400 may be included in a network entity and/or UE such as an entity within network 12 and/or UE 14 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 14:
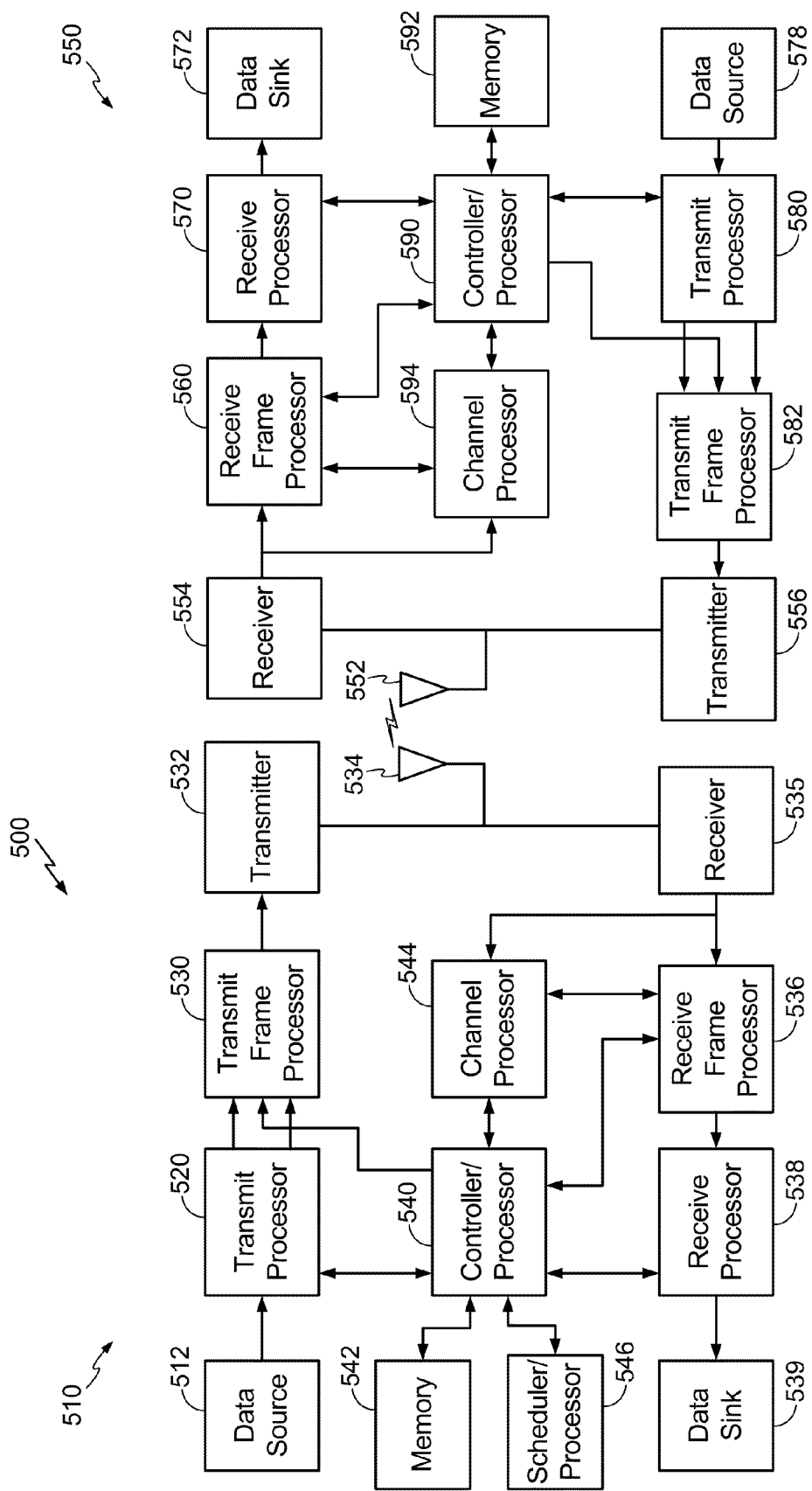
FIG. 14 is a block diagram conceptually illustrating an example of a Node B in communication with a UE in a telecommunications system configured to perform the functions described herein.

FIG. 14 is a block diagram of a communication system 500 including a Node B 510 in communication with a UE 550, where Node B 510 may be an entity within network 12 and the UE 550 may be UE 14 according to the aspect described in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames.

The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 8 or 10) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106 (FIG. 10). The computer-readable medium 106 (FIG. 10) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a signal from a network;
   obtaining an autocorrelation of the received signal, wherein the autocorrelation indicates correlation of the received signal with a delayed signal for each of a plurality of delays;
   obtaining a pruned autocorrelation of the received signal for a channel delay spread wherein correlations due to delays less than the channel delay spread are removed from the autocorrelation;
   determining pruned autocorrelation properties of the received signal;
   comparing the pruned autocorrelation properties of the received signal against a reference threshold; and
   verifying that the received signal is a valid signal for WCDMA processing based on the comparison of the pruned autocorrelation properties of the received signal with the reference threshold.

2. The method of claim 1, wherein pruning length is based on a radio channel of the received signal.

3. The method of claim 1, wherein specific delays of the received signal are determined by coexisting technologies.

4. The method of claim 1, wherein obtaining the pruned autocorrelation for the channel delay spread includes setting values of the autocorrelation of the received signal to zero for delays less than the channel delay spread.

5. The method of claim 1, wherein determining the pruned autocorrelation properties of the received signal comprises obtaining a peak pruned autocorrelation of the received signal and an average pruned autocorrelation of the received signal.

6. The method of claim 5, wherein determining the pruned autocorrelation properties of the received signal further comprises obtaining a peak to average pruned autocorrelation (PAPR) ratio of the received signal.

7. The method of claim 6, further comprising determining pruned autocorrelation properties via extracting the PAPR of the pruned autocorrelation of the received signal.

8. The method of claim 6, wherein verifying that the received signal is a valid signal for WCDMA processing is based on a comparison of the PAPR of the pruned autocorrelation of the received signal against the reference threshold.

9. The method of claim 1, wherein the reference threshold is variable based on UE input.

10. The method of claim 1, wherein the reference threshold is fixed after comparing the pruned autocorrelation properties of the received signal.

11. An apparatus of wireless communication in a wireless communication network, comprising:
    at least one processor; and
    a memory couple to the at least one processor, wherein the at least one processor is configured to:
    receive a signal from a network;
    obtain an autocorrelation of the received signal, wherein the autocorrelation indicates correlation of the received signal with a delayed signal for each of a plurality of delays;
    obtain a pruned autocorrelation for a channel delay spread wherein correlations due to delays less than the channel delay spread are removed from the autocorrelation;
    determine pruned autocorrelation properties of the received signal;
    compare the pruned autocorrelation properties of the received signal against a reference threshold;
    verify that the received signal is a valid signal for WCDMA processing based on the comparison of the pruned autocorrelation properties of the received signal with the reference threshold.

12. The apparatus of claim 11, wherein pruning length is based on a radio channel of the received signal.

13. The apparatus of claim 11, wherein specific delays of the received signal are determined by coexisting technologies.

14. The apparatus of claim 11, wherein the at least one processor is configured to obtain the pruned autocorrelation for the channel delay spread by setting values of the autocorrelation of the received signal to zero for delays less than the channel delay spread.

15. The apparatus of claim 11, wherein the at least one processor is further configured to obtain a peak pruned autocorrelation of the received signal and an average pruned autocorrelation of the received signal.

16. The apparatus of claim 15, wherein the at least one processor is further configured to obtain a peak to average pruned autocorrelation (PAPR) ratio of the received signal.

17. The apparatus of claim 16, wherein the at least one processor is further configured to determine pruned autocorrelation properties via extracting the PAPR of the pruned autocorrelation of the received signal.

18. The apparatus of claim 16, wherein the at least one processor is configured to verify that the received signal is a valid signal for WCDMA processing based on a comparison of the PAPR of the pruned autocorrelation of the received signal against the reference threshold.

19. The apparatus of claim 11, wherein the reference threshold is variable based on UE input.

20. The apparatus of claim 11, wherein the reference threshold is fixed after comparing the pruned autocorrelation properties of the received signal.

21. An apparatus of wireless communication in a wireless communication network, comprising:
    means for receiving a signal from a network;
    means for obtaining an autocorrelation of the received signal, wherein the autocorrelation indicates correlation of the received signal with a delayed signal for each of a plurality of delays;
    means for obtaining a pruned autocorrelation of the received signal for a channel delay spread wherein correlations due to delays less than the channel delay spread are removed from the autocorrelation;
    means for determining pruned autocorrelation properties of the received signal;
    means for comparing the pruned autocorrelation properties of the received signal against a reference threshold; and
    means for verifying that the received signal is a valid signal for WCDMA processing.

22. A non-transitory computer readable medium storing computer executable code, comprising:
    code for receiving a signal from a network;
    code for obtaining an autocorrelation of the received signal, wherein the autocorrelation indicates correlation of the received signal with a delayed signal for each of a plurality of delays;
    code for obtaining a pruned autocorrelation of the received signal for a channel delay spread wherein correlations due to delays less than the channel delay spread are removed from the autocorrelation;
    code for determining pruned autocorrelation properties of the received signal;

code for comparing the pruned autocorrelation properties of the received signal against a reference threshold; and
code for verifying that the received signal is a valid signal for WCMDA processing.

* * * * *